M. P. WANNER.
CLEVIS.
APPLICATION FILED OCT. 2, 1918.
1,360,159.
Patented Nov. 23, 1920.
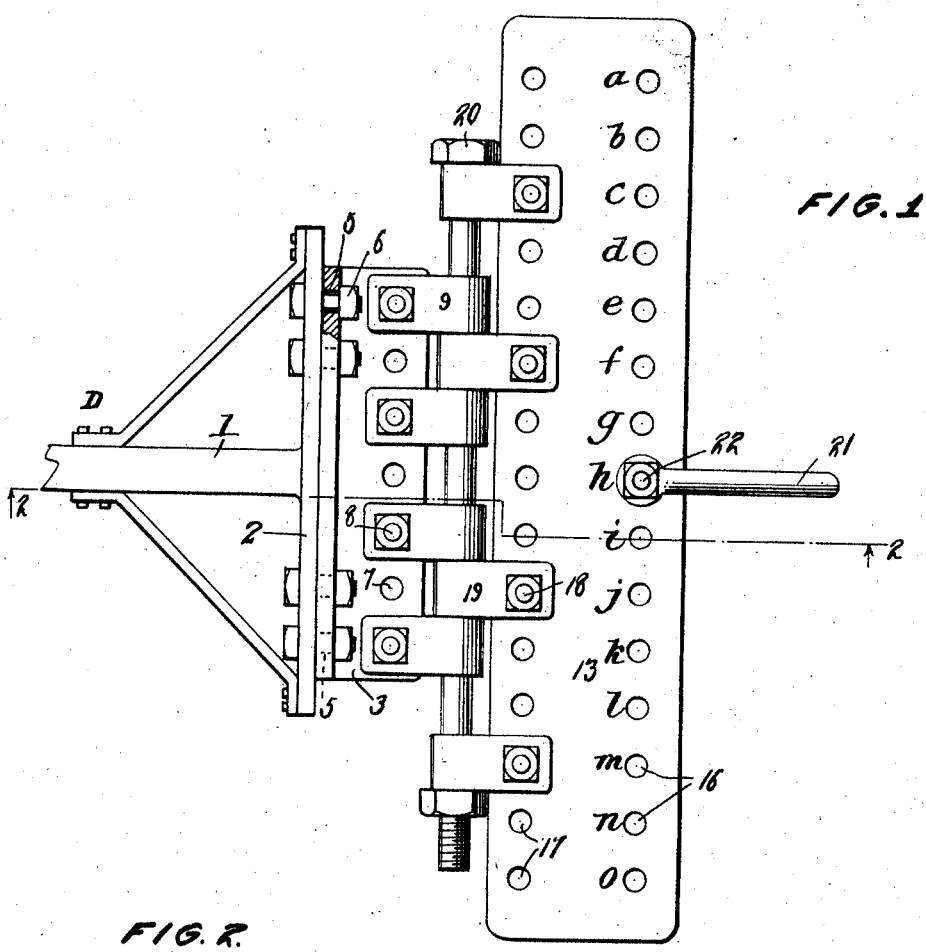
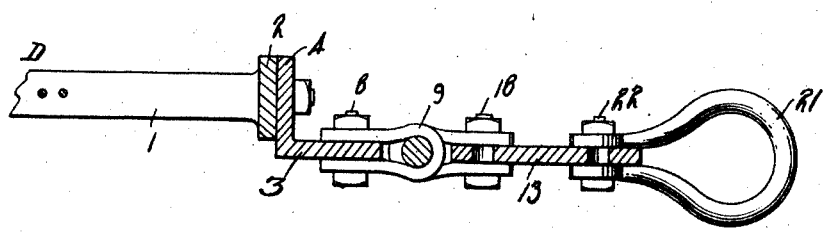
WITNESSES
W. C. Fielding
N. L. Collamer
INVENTOR
Michael P. Wanner
BY
Richard Owen
ATTORNEY

UNITED STATES PATENT OFFICE.

MICHAEL P. WANNER, OF SCHEFIELD, NORTH DAKOTA.

CLEVIS.

1,360,159.  Specification of Letters Patent.  Patented Nov. 23, 1920.

Application filed October 2, 1918. Serial No. 256,542.

*To all whom it may concern:*

Be it known that I, MICHAEL P. WANNER, a citizen of the United States, residing at Schefield, in the county of Stark and State of North Dakota, have invented certain new and useful Improvements in Clevises, of which the following is a specification.

This invention relates to plows, and more especially it is a clevis or connection between the draft and the units connected therewith, constructed so as to flex and so as to permit lateral adjustment in case the several units do not afford the same resistance. Details of the construction of this device are set forth in the following specification and shown in the drawings, wherein:—

Figure 1 is a plan view, and

Fig. 2 a longitudinal section on the line 2—2 of Fig. 1.

The draft is herein broadly indicated by the letter D, being shown on the drawings as a tongue or pole 1 leading to the center of a base bar 2, but I desire it clearly understood that the draft might be any that is available, and I do not wish to be limited in this respect. Just in rear of said base bar is the forward member or leaf 3 of my improved clevis, the same being bent up at its forward edge into an upright flange 4 which lies in rear of and in contact with the base bar 2. These elements are pierced with holes 5 through which pass bolts 6 at intervals, and four of such bolts are shown in the present case. Thus the front member 3 may be said to be rigidly connected with a draft means. The body of this member is provided with a transverse row of holes 7 through certain of which pass bolts 8 as shown, these bolts passing also through both ends of U-shaped straps 9 which may be said to constitute knuckles as will be set forth below.

The rearward member or leaf 13 is a flat plate of considerable length having through its body along its front edge a transverse row of holes 17, and through its body along its rear edge a similar row of holes 16. At intervals bolts 18 pass through certain of the front row of holes, and through the ends of bent straps or loops which also constitute knuckles 19 interposed between the knuckles 9 above referred to; and a rod or bolt passes through the bends of all the loops or interlocking knuckles and constitutes the pintle 20 of the hinge thus produced. This rod in the present case is itself shown as a rather large bolt having a head at one end and a nut at the other so that when withdrawn the parts of the device may be readily separated. The rear leaf is intended for connection with the plow or other unit or units which are to be drawn. In the present instance I have shown but a single loop or clevis at 21, whose arms pass astride the leaf 13 and are connected with the central hole thereof by means of a bolt 22; but it will be clear that a larger number of units could be attached to this leaf by employing a larger number of clevises or connecting members 21. I have lettered the holes in the rear row 16 from *a* to *o* inclusive, and of course the central hole would bear the letter *h*. If two members 21 were to be employed, they would probably be connected with the holes *d* and *l*, or four members would probably be connected with the holes *b*, *f*, *j*, and *n*, but these details may be left to the user.

When the parts are assembled as shown, draft applied by any suitable means which causes the forward movement of the bar 2 will of course, draw the front leaf 3 forward, since it is bolted to said bar. This leaf being connected by a hinge joint with the rear leaf 13 will cause the latter to move forward, and the disposition of the knuckles 9 and 19 connecting these leaves is a matter of choice, although a very good arrangement is that shown in Fig. 1. The units to be drawn are now hinged to the rear leaf by means of an attaching member 21 or several of them, and obviously they must be disposed in such manner that the draft will not be interrupted nor its forward progress diverted obliquely to the line traveled. That is to say, if there were two units with equal resistance, they might be connected up with holes in the row 16 equi-distant from the central hole *h*, whereas if there were two units of unequal resistance, that of lesser resistance should be disposed farther from the center than the remaining unit. All this is possible with the several series of holes referred to, and the device therefore has adaptabilities which are useful in this connection.

The foregoing description and the accompanying drawings have reference to the preferred or approved embodiment of the invention. It is to be understood however that such changes may be made in construction and arrangement of parts, materials, dimensions, etc., as may prove expedient and fall within the scope of the appended claim.

What is claimed as new is:

In a clevis of the character described, the combination of a rear leaf having a row of perforations adjacent each edge thereof, a loop secured to a selected perforation of one row, said loop extending rearwardly, a plurality of forwardly extending loops connected to said leaf through selected perforations of the remaining row, a front leaf having draft means connected thereto, said front leaf having a row of perforations adjacent its rear edge, a plurality of rearwardly extending loops connected to the front leaf through the row of perforations thereof, and a bolt passing through the forwardly extending loops of the rear leaf and the rearwardly extending loops of the forward leaf for connecting the same together, whereby all of said loops may be adjusted along said leaves, independently or uniformly together, all for the purposes set forth.

In testimony whereof I affix my signature in presence of two witnesses.

MICHAEL P. WANNER.

Witnesses:
H. F. LITTIG,
H. A. BORCHERDING.